(No Model.)

S. H. SHORT.
MOTOR CASING.

No. 599,918. Patented Mar. 1, 1898.

Witnesses.
E. B. Gilchrist
N. M. Rankin

Inventor.
Sidney H. Short,
By his Attorneys,
Thurston & Bates.

UNITED STATES PATENT OFFICE.

SIDNEY H. SHORT, OF CLEVELAND, OHIO.

MOTOR-CASING.

SPECIFICATION forming part of Letters Patent No. 599,918, dated March 1, 1898.

Application filed February 16, 1897. Serial No. 623,760. (No model.)

*To all whom it may concern:*

Be it known that I, SIDNEY H. SHORT, a citizen of the United States, residing at Cleveland, in the county of Cuyahoga and State of Ohio, have invented certain new and useful Improvements in Motor-Casings; and I do hereby declare the following to be a full, clear, and exact description of the invention, such as will enable others skilled in the art to which it appertains to make and use the same.

Electric motors used upon street-cars are inclosed in a casing to protect them, and the armature-shaft is journaled in the ends of the casing. The shaft revolves rapidly, and consequently the bearings rapidly wear down, the result being that the armature will sooner or later touch the stationary field-cores unless the said bearings are remade.

The object of my invention is to construct the casing in such manner that without opening it its interior may be inspected from time to time in such manner as to show when the said bearings should be remade. When as now such inspection is impossible, the bearings are rarely rebabbitted at just the right time. Either they remain in use so long that the armature touches the field-cores, thereby injuring the machine, or they are rebabbitted before it is necessary, and therefore at an unnecessary expense.

Figure 1:
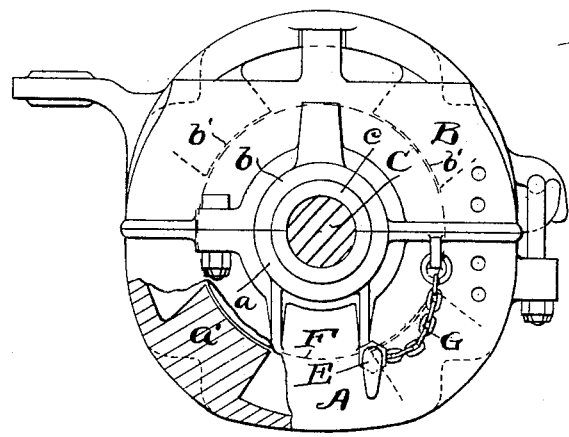
Figure 2:
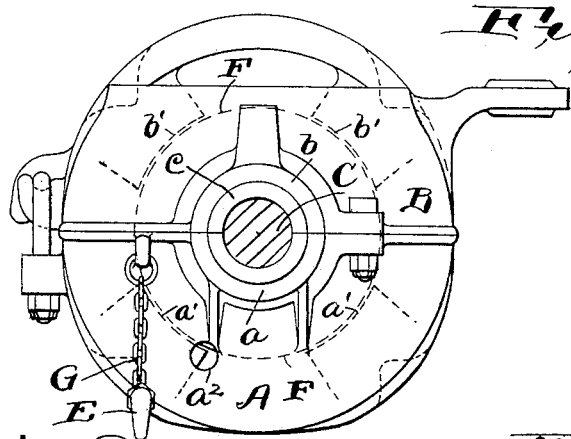
Figure 3:
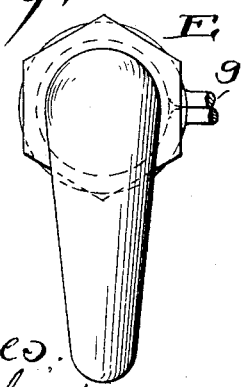
Figure 4:
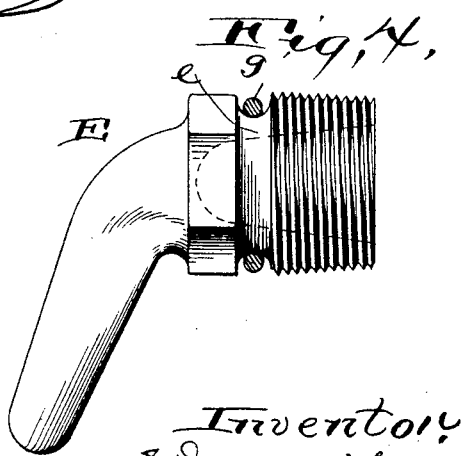

In the drawings, Figure 1 is one end elevation of the casing. Fig. 2 is an elevation of the opposite end. Fig. 3 is an enlarged end view of one of the screw-plugs, and Fig. 4 is a side view of the same.

Referring to the parts by letters, A represents the lower half of the motor-casing, and B the upper half of the casing. On the ends of the casing-halves are the semicylindrical bosses $a$ and $b$, which embrace and support the bearings $c$ for the shaft C, which bearings are made of Babbitt metal or other suitable material.

$a'$ and $b'$ represent the field-cores, which are formed integral with the inner faces of the casing-halves and project radially inward therefrom. The armature is secured to the shaft and its position is indicated by the dotted line F.

A hole $a^2$ is tapped through each end of the lower half of the casing in line with the lower corner of one of the field-cores, wherefore one may look through one of these holes toward the other and see how far from the core the armature is, and thereby learn when the bearings should be rebabbitted. E represents a screw-plug for closing these holes. On each plug is an approximately radial crank-arm which serves two purposes—viz., it furnishes means for screwing in and unscrewing the plug, and it also prevents the plug from working loose when the motor is in service. It hangs down in a substantially vertical position, wherefore no jarring of the casing, which otherwise would cause the plug to work out, can have the effect of swinging this arm around.

The plug has an annular groove $e$, which is embraced by a ring $g$, and the ring is fastened to a chain G, which is in turn fastened to the casing.

Having described my invention, I claim—

1. In an electric motor, a motor-casing composed of two parts, each consisting of a body and two integral ends, the body part having field-cores projecting inwardly from their inner surfaces, and the ends being provided with bearing-bosses $a$, $b$, the lower portions of the casing being provided with two inspection-holes $a^2$ placed in a line with each other, and at a point where the distance between the lower portion of the armature and the upper ends of the lower field-cores can be inspected, combined with plugs for closing said ends, which plugs are provided with weighted outer ends, substantially as shown.

2. The combination of the armature of an electric motor, and its shaft, with a two-part casing, having the field-cores on its inner surface and having in its ends bearings for the armature-shaft, both of the ends of the lower half of the casing having, in line with the end of one of the field-cores near its lowest point, inspection-holes, and removable screw-plugs for closing said holes, each plug having a crank-arm on its outer end, substantially as and for the purpose specified.

In testimony whereof I affix my signature in presence of two witnesses.

SIDNEY H. SHORT.

Witnesses:
E. L. THURSTON,
ALBERT H. BATES.